(12) United States Patent
Vilkki

(10) Patent No.: US 10,843,382 B2
(45) Date of Patent: Nov. 24, 2020

(54) METHOD FOR MANUFACTURING A PLASTIC COMPOSITION

(71) Applicants: CONENOR OY, Tampere (FI); Markku Vilkki, Lahti (FI)

(72) Inventor: Markku Vilkki, Lahti (FI)

(73) Assignee: CONENOR OY, Tampere (FI)

( * ) Notice: Subject to any disclaimer, the term of this patent is extended or adjusted under 35 U.S.C. 154(b) by 230 days.

(21) Appl. No.: 15/886,981

(22) Filed: Feb. 2, 2018

(65) Prior Publication Data

US 2018/0229397 A1   Aug. 16, 2018

(30) Foreign Application Priority Data

Feb. 10, 2017  (EP) ..................................... 17155520

(51) Int. Cl.
*C08L 63/00* (2006.01)
*C08L 67/00* (2006.01)
(Continued)

(52) U.S. Cl.
CPC ................ *B29B 7/005* (2013.01); *B29B 7/10* (2013.01); *B29B 7/90* (2013.01); *B29B 9/08* (2013.01); *B29B 13/022* (2013.01); *B29B 13/045* (2013.01); *C08K 3/04* (2013.01); *C08K 3/26* (2013.01); *C08K 3/346* (2013.01); *C08K 3/36* (2013.01); *C08K 3/38* (2013.01); *C08K 3/40* (2013.01); *C08K 5/09* (2013.01); *C08K 5/14* (2013.01); *C08L 23/06* (2013.01); *C08L 23/12* (2013.01); *C08L 23/20* (2013.01); *C08L 25/06* (2013.01); *C08L 27/06* (2013.01); *C08L 55/02* (2013.01); *C08L 63/00* (2013.01);
(Continued)

(58) Field of Classification Search
CPC ....................................................... B29B 7/005
USPC ............................................................. 264/6
See application file for complete search history.

(56) References Cited

U.S. PATENT DOCUMENTS 4,820,469 A * 4/1989 Walsh ..................... B29C 48/37
264/506
4,970,043 A * 11/1990 Doan ..................... B29B 9/065
264/237
(Continued)

FOREIGN PATENT DOCUMENTS

| EP | 0 401 885 | 12/1990 | |
|---|---|---|---|
| EP | 0401885 A1 * | 12/1990 | ............. B29B 11/10 |
| WO | WO 01/08862 | 2/2001 | |

OTHER PUBLICATIONS

Sigma-Aldrich Particle Size Conversion Table www.sigmaaldrich.com/chemistry/stockroom-reagents/learning-center/technical-library/particle-size-conversion.html (Year: 2008).*

(Continued)

*Primary Examiner* — Matthew J Daniels
*Assistant Examiner* — Wayne K. Swier
(74) *Attorney, Agent, or Firm* — Nixon & Vanderhye P.C.

(57) ABSTRACT

A method for manufacturing a plastic composition, comprising: mixing thermoplastic polymer material particles and thermoset composition particles comprising cured thermoset polymer, the mixing comprising rising the temperature of the composition and at least partly melting the surface of thermoplastic polymer material particles, and simultaneously mixing the particles allowing thermoset composition particles adhere to the thermoplastic polymer material particles, and cooling the composition.

15 Claims, 2 Drawing Sheets

(51) Int. Cl.

| | | |
|---|---|---|
| C08L 75/04 | (2006.01) | |
| B29B 7/00 | (2006.01) | |
| B29B 7/10 | (2006.01) | |
| B29B 9/08 | (2006.01) | |
| B29B 13/02 | (2006.01) | |
| B29B 13/04 | (2006.01) | |
| C08K 3/04 | (2006.01) | |
| C08K 3/26 | (2006.01) | |
| C08K 3/34 | (2006.01) | |
| C08K 3/36 | (2006.01) | |
| C08K 3/38 | (2006.01) | |
| C08K 3/40 | (2006.01) | |
| C08K 5/09 | (2006.01) | |
| C08K 5/14 | (2006.01) | |
| C08L 23/06 | (2006.01) | |
| C08L 23/12 | (2006.01) | |
| C08L 23/20 | (2006.01) | |
| C08L 25/06 | (2006.01) | |
| C08L 27/06 | (2006.01) | |
| C08L 55/02 | (2006.01) | |
| B29B 7/90 | (2006.01) | |
| B29K 105/06 | (2006.01) | |
| B29K 105/24 | (2006.01) | |
| B29K 101/12 | (2006.01) | |
| B29B 9/16 | (2006.01) | |
| B29K 105/10 | (2006.01) | |

(52) U.S. Cl.
CPC ............... *C08L 67/00* (2013.01); *C08L 75/04* (2013.01); *B29B 9/16* (2013.01); *B29K 2101/12* (2013.01); *B29K 2105/065* (2013.01); *B29K 2105/106* (2013.01); *B29K 2105/24* (2013.01); *C08K 2003/265* (2013.01); *C08L 2207/04* (2013.01); *Y02W 30/62* (2015.05)

(56) References Cited

U.S. PATENT DOCUMENTS

| | | | | |
|---|---|---|---|---|
| 5,075,057 | A * | 12/1991 | Hoedl | B29B 17/0026 264/115 |
| 5,861,117 | A * | 1/1999 | Rosenbaum | B29B 17/0026 264/37.1 |
| 6,224,796 | B1 * | 5/2001 | Grenier | B29B 7/005 264/349 |
| 6,497,956 | B1 * | 12/2002 | Phillips | B29B 17/0042 264/913 |
| 8,476,367 | B1 * | 7/2013 | Howell | B29B 9/065 525/95 |
| 2003/0125399 | A1 * | 7/2003 | Zhang | B29B 17/0026 521/40 |

OTHER PUBLICATIONS

Search Report for EP 17 15 5520, dated Mar. 29, 2017, 2 pages.
Office Action issued in EP Appln. No. 17 155 520.4 dated Jan. 17, 2019.

\* cited by examiner

METHOD FOR MANUFACTURING A PLASTIC COMPOSITION

This application claims priority to EP Patent Application No. 17155520.4 filed 10 Feb. 2017, the entire contents of which is hereby incorporated by reference.

BACKGROUND

The invention relates to a method for manufacturing a plastic composition.

It is a growing tendency in the world to use more and more polymer materials as such or plastic compositions filled with filler material or reinforcing fibres in production of all kind of industrial and consumer products. Together with this tendency also the amount of polymer materials and compositions withdrawn form primary use is substantially growing.

According to the Composites UK Ltd report published 7 Jul. 2016 the use of composites is expected to reach $95 bn globally by 2020, an increase of 40% from 2014. The report states "Inevitably this results in more waste from manufacturing, and an increasing challenge to develop economically sustainable recycling routes for end-of-life."

A problem with this is that recycling of thermosets and thermoset compositions, such as fibre reinforced plastic (FRP), is more than difficult i.e. practically not existing, and a stumbling block in large industrial sectors where the pressure to offer environmental friendly solutions to save earth resources and thus to recycle is high, particularly in aerospace, marine, wind energy, construction and automotive.

The project leading to this application has received funding from the European Union's Horizon 2020 research and innovation program under grant agreement Nos. 642085 and 730456.

BRIEF DESCRIPTION

Viewed from a first aspect, there can be provided a method for manufacturing a plastic composition, comprising: mixing thermoplastic polymer material particles and thermoset composition particles comprising cured thermoset polymer, the mixing comprising rising the temperature of the composition and at least partly melting the surface of thermoplastic polymer material particles, and simultaneously mixing the particles allowing thermoset composition particles adhere to the thermoplastic polymer material particles, and cooling the composition.

Thereby a method that offers economically viable route for re-manufacturing in particular thermosets and thermoset compositions and consequently expands global recycling volumes may be achieved.

Some other embodiments are characterised by what is stated in the other claims. Inventive embodiments are also disclosed in the specification and drawings of this patent application. The inventive content of the patent application may also be defined in other ways than defined in the following claims. The inventive content may also be formed of several separate inventions, especially if the invention is examined in the light of expressed or implicit subtasks or in view of obtained benefits or benefit groups. Some of the definitions contained in the following claims may then be unnecessary in view of the separate inventive ideas. Features of the different embodiments of the invention may, within the scope of the basic inventive idea, be applied to other embodiments.

In one embodiment, the melting temperature of the thermoplastic polymer material is not more than 200° C., preferably not more than 170° C.

An advantage is that natural fibres do allow high processing temperatures without degradation and the same applies also to most of the thermoset polymers.

In one embodiment, the thermoplastic polymer material is chosen from a group consisting of TPE, PVC and polyolefins, such as PB, PE and PP, PS, ABS, PMMA, PBA, PLA, PHA, PHB, and a combination thereof.

An advantage is that those materials of crude oil origin are commonly available in volumes within recycled thermoplastics and those materials of biobased origin are becoming popular in future and replacing the crude oil origin polymers. Furthermore, all the materials are suitable for processing at temperatures below 200° C. and in existing processing equipment today in the market place.

In one embodiment, the method comprises adding filler material that is included in the thermoplastic polymer material particles and/or thermoset composition particles, or as an addition of a separate batch of filler material.

An advantage is that, without wishing to be bound by any theory, the filler material may serve as a bonding medium between the thermoplastic and thermoset materials. Said bonding effect may be intensified by adding coupling agent(s), such as maleic anhydride acid (MAH), in the composition.

Another advantage is that a lower cost material may be achieved.

In one embodiment, the filler material comprises natural fibres derived and chosen from a group consisting of wood, straw, abaca, cotton, cork, bamboo, paper, cardboard, hemp, jute, kenaf, sisal, rice hull, flax, cellulose, coir and a combination thereof.

In one embodiment, the thermoplastic polymer material comprises wood-plastic composite (WPC), comprising thermoplastic material and wood fibres.

An advantage is that a composition having better physical properties, such as higher strength and stiffness, may be achieved. The composition is recyclable and promotes the use of biobased materials widely found at marginal costs in forestry and agricultural side streams as well as construction & demolition waste.

In one embodiment, the thermoplastic polymer material comprises wood-plastic composite (WPC), comprising thermoplastic material and wood fibres, and the thermoset composition is recycled material comprising thermoset matrix and reinforcing fibres.

An advantage is that the use of thermoset matrix with reinforcing (nowadays typically inorganic) fibres in the WPCs increases the physical properties, such as strength and stiffness, water absorption, dimensional stability, surface hardness, of the WPC-composite and allows it being used in new expanded application areas such as many of those where much stiffer materials than WPC e.g. plywood is commonly used.

In one embodiment, the thermoplastic polymer material particles are derived from waste hybrid materials, such as plastic coated cardboard, cellulose, and metal foil.

An advantage is that the hybrid materials, where the different material layers cannot be easily and economically separated, may be recycled without said separation as they are in a sustainable way. Furthermore, costs of the composition are low.

In one embodiment, the filler comprises minerals chosen from a group consisting of calcium carbonate, talc, wollastonite, mica, kaolin clay, silica, and a combination thereof.

An advantage is that the mineral promotes product surface smoothness, stiffness, dimensional stability and higher output in processing. Additionally, material cost of the composition may be lowered.

In one embodiment, the fibre filler comprises synthetic fibres chosen from a group consisting of glass, carbon, aramid, PE, boron, silicon carbide, and a combination thereof.

An advantage is that a composition having better physical properties, such as higher strength and stiffness, may be achieved.

In one embodiment, the method comprises adding one or more coupling agent(s), such as maleic anhydride acid (MAH), a crosslinking media, such as peroxide or silane, in the composition.

An advantage of the coupling agent(s) is that the properties of the filler-thermoplastic polymer composition may be significantly improved by creating a chemical bonding between the materials of the composition. This is especially beneficial if the composition comprises polar and inpolar materials. Further by crosslinking the composition promotes higher impact strength which can be a weak point of high filled composites. Also crosslinking is found reducing greatly edge tearing in extrusion of compositions with low viscous polymers.

In one embodiment, the amount of the thermoset composition is between 5% and 85%, preferably between 10% and 75%, by weight of the composition.

An advantage is that it allows wide tailoring and optimising of product properties per application criteria e.g. between stiffness and flexibility and impact. In a multilayered product construction the inner layer may be stiff at high filling rate of the thermoset composition while the outer layer having low filling rate for appropriate impact properties and surface smoothness and low friction when applicable.

In one embodiment, the composition comprises thermoplastic polymer material, thermoset composition and added filler material each at least roughly equal amounts in weight, and additional substances. For instance, the composition may comprise 31%-32% thermoplastic polymer material, 31%-32% thermoset composition, 31%-32% added filler material, such as wood fibre and/or mineral filler, and 4%-7% additional substances, all expressed by weight of the total weight of the composition.

An advantage is that wearing of processing equipment may be reduced.

In one embodiment, the size of the thermoset composition particles fed in the mixing may be as large as 100 mm, though preferably smaller than 50 mm.

An advantage is that there is no need for grinding and/or milling the thermoset composition in small particles, and therefore the method is inexpensive and optimally made in one step in single equipment, and its energy consumption is low. Furthermore, evading the grinding and/or milling process saves long reinforcing fibres, if any, included in the thermoset composition.

In an embodiment, the size of the thermoset composition particles is about 1 mm or more.

This applies e.g. to post-industrial shavings of thermoset compositions which do not need any downsizing for feeding in the mixing. An advantage is that the material can be used as it is without any pre-treatments at minimum costs and yet it, or at least part of the fibres, has a certain minimum fibre length to promote the wanted fibre reinforcement effect in physical properties of e.g. in an extruded or rotation moulded product.

In an embodiment, there is no limit for minimum size of the thermoset composition particles.

An advantage is that extremely fine-sized thermoset dust directly obtainable from sanding of a thermoset composite product may be exploited and recycled in optimal way if the composition becomes used in e.g. injection moulding machines in pellet form.

In one embodiment, the cured thermoset polymer is chosen from a group consisting of epoxy, polyester, vinyl ester, phenolic, amino, furan, polyurethane, vulcanised rubber, cross-linked thermoplastic, such as PEX, and a combination thereof.

A common advantage for all of them is that as they have very few viable recycling solutions if any, the method provides for all of them the route for re-manufacturing in thermoplastic compositions and marketable products and made in conventional existing equipment. The purpose and reasoning may be different; while e.g. rigid fibre reinforced thermoplastics (FRP) bring the composition primarily wanted higher strength and stiffness—flexible materials e.g. rubber and polyurethanes bring ductility and high impact— and when mixing crosslinked PEX in polyethylene based compositions it creates molecular bonding to the polymer without a need of using relatively expensive coupling agents and promotes low cost basis.

In one embodiment, the thermoset composition particles are derived from thermosetting post-industrial and/or post-consumer side streams, waste or shavings.

An advantage is that the cost of such material is low, or even zero, and they may be recycled in a sustainable way. Notable is also that as of beginning the year 2016 the valid EU-legislation denies such materials from becoming landfilled but due the lack of recycling solution national governments in EU have allowed with annually extensions the former practice to continue.

In one embodiment, the mixing comprises: adding a batch of the thermoplastic polymer material particles and a batch of the thermoset composition particles in a high intensity mixer, the mixer comprising a vessel establishing an interior space environmentally separable from an exterior space outside of said vessel, an agitation system comprising mixing and shear heating means arranged in said interior space, and drive means adapted to rotate said mixing means, agitating the particles by the mixing and shear heating means means, resulting rising the temperature of the composition above the glass transition temperature (Tg) of the thermoset composition particles and thereby allowing the thermoset composition particles to soften and get downsized into fines (excluding cured TPE and crosslinked thermoplastics) by mechanical forces in said vessel, allowing the surface of thermoplastic polymer material particles melting at least partly, allowing thermoset composition particles adhere to the thermoplastic polymer material particles, thus forming agglomerates comprising the thermoplastic polymer material and the thermoset composition and optional fillers and additives, and cooling the agglomerates e.g. by lowering the energy of the agitation.

An advantage is that the method may be carried out in simple and commonly in industry existing equipment since decades (ref. "PVC-mixer") at low cost basis and minimum energy use.

In one embodiment, the plastic composition is processed into pellets for use in processing methods of thermoplastic materials.

An advantage is that the composition may be used as a compound and dosed gravimetrically in dry blending equipment and handled as sellable dust free homogenised material for any commonly used thermoplastic processes and equipment.

BRIEF DESCRIPTION OF FIGURES

Some embodiments illustrating the present disclosure are described in more detail in the attached drawings, in which.

In the figures, some embodiments are shown simplified for the sake of clarity. Similar parts are marked with the same reference numbers in the figures.

DETAILED DESCRIPTION

Figure 1:
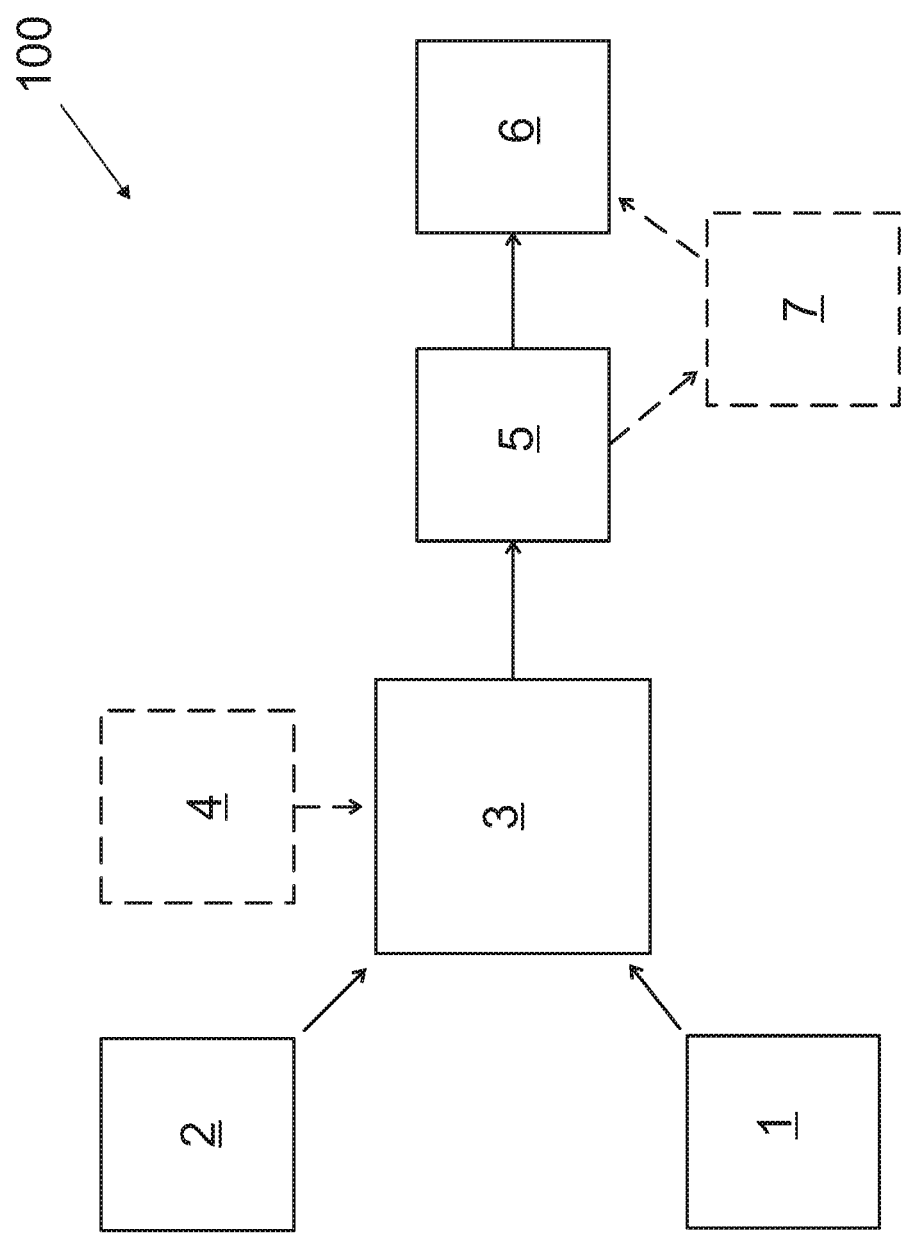
FIG. 1 is a flow chart of a method for manufacturing a plastic composition.

FIG. 1 is a flow chart of a method for manufacturing a plastic composition. According to an aspect, the method 100 comprises mixing thermoplastic polymer material 1 in form of particles and thermoset composition 2 comprising cured thermoset polymer in form of particles.

According to an idea, the thermoplastic polymer material 1 is chosen from a group consisting of thermoplastic elastomers (TPE), polyvinyl chloride (PVC) and polyolefins, such as polybutylene (PB), polyethylene (PE) and polypropylene (PP), polystyrene (PS), acrylonitrile-butadiene-styrene (ABS), poly(methyl methacrylate) (PMMA), poly(butyl acrylate) (PBA), polylactic acid (PLA), polyhydroxyalkanoate (PHA), polyhydroxybutyrate (PHB), and a combination thereof. However, the thermoplastic polymer material 1 may also comprise some other material not listed above.

In an embodiment, the thermoplastic polymer material 1 is virgin material. In another embodiment, the thermoplastic polymer material 1 is recycled material. In still further embodiment, the thermoplastic polymer material 1 comprises both virgin and recycled material.

According to an aspect, the thermoplastic polymer material 1 may comprise filler material. In an embodiment, the filler material comprises fibres. The fibres may comprise synthetic fibres chosen e.g. from a group consisting of glass, carbon, aramid, polyethylene, boron, silicon carbide, and a combination thereof, and/or natural fibres derived and chosen e.g. from a group consisting of wood, straw, abaca, cotton, cork, bamboo, paper, cardboard, hemp, jute, kenaf, sisal, rice hull, flax, cellulose, coir and a combination thereof.

In an embodiment, the thermoplastic polymer material 1 comprises mineral fillers chosen from e.g. a group consisting of calcium carbonate, talc, wollastonite, mica, kaolin clay, silica, and a combination thereof.

In an embodiment the thermoplastic polymer material 1 is recycled material derived from hybrid materials, such as plastic coated cardboard, cellulose, and metal foil.

The particles of the thermoplastic polymer material 1 may be in form of pellets, shreds, crush, flakes, powder etc. The particle size is preferably not more than 30 mm.

According to an idea, the cured thermoset polymer of the thermoset composition 2 is chosen from a group consisting of epoxy, polyester, vinyl ester, phenolic, amino, furan, polyurethane, vulcanised rubber, cross-linked thermoplastic, such as crosslinked polyethylene (PEX), and a combination thereof. However, the cured thermoset polymer may also comprise some other thermoset material not listed above.

In an embodiment, the thermoset composition 2 is derived from thermosetting post-industrial and/or post-consumer side streams, waste or shavings. The thermoset composition 2 may be derived e.g. from fibre-reinforced boats and yachts, vessels, tanks, containers, sport and leisure goods, wind turbine blades, pipes & tubes, construction profiles, various parts in transportation and automotive and aerospace vehicles, laminates, and other consumer goods and including hybrid products where fibre reinforced thermosets are coupled to other materials e.g. wood.

In an embodiment, the thermoset composition 2 comprises fibre-reinforced plastic (FRP), i.e. composite material made of a thermoset polymer matrix reinforced with fibres. The fibres may comprise synthetic fibres chosen e.g. from a group consisting of glass, carbon, aramid, polyethylene, boron, silicon carbide, and a combination thereof, and/or natural fibres derived and chosen e.g. from a group consisting of wood, straw, abaca, cotton, cork, bamboo, paper, cardboard, hemp, jute, kenaf, sisal, rice hull, flax, cellulose, coir and a combination thereof.

In an embodiment, the thermoset composition 2 comprises mineral fillers chosen from e.g. a group consisting of calcium carbonate, talc, wollastonite, mica, kaolin clay, silica, and a combination thereof.

There is a limit for the maximum size of the thermoset composition particles fed in the mixing. In an embodiment, the limit is 100 mm, in another embodiment the limit is 50 mm. Thus it is possible to feed quite large particles in the mixing, and there is no need for chopping or grinding the material in small particle size.

Also one or more additional substances 4 may be mixed with the thermoplastic and thermoset. The additional substances 4 may comprise e.g. coupling agent(s), such as maleic anhydride acid (MAH), a crosslinking media, such as peroxide or silane, processing aids, pigments etc. In an embodiment, where the thermoplastic polymer material comprises polyolefin, the coupling agent(s), such as maleic anhydride acid (MAH), are preferably used for enhancing adhesion of the polyolefin molecules to e.g. filler material.

The mixing 3 takes place in a high intensity mixer as a batch process. According to an aspect, the mixer comprises a vessel that establishes an interior space environmentally separated from an exterior space outside of said vessel, an agitation system comprising mixing and shear heating means arranged in said interior space, and drive means, such as electric motor or pressure medium driven motor, adapted to rotate said mixing means.

In an embodiment, the high intensity mixer is a mixer commonly known as "PVC-mixer" or "hot-cold-mixer". This type of mixer typically comprises two mixing vessels: a hot vessel and a cold vessel. The hot vessel comprises mixing and shear heating means that heat up the composition. Additionally, the casing of the hot vessel may be heated by e.g. hot oil or electric heating device. The cold vessel can be cooled e.g. by water in order to lower the temperature of the composition.

The thermoplastic polymer material 1, the thermoset composition 2, and additional substances 4, if any, are weighed and introduced in the mixer.

In an embodiment, the amount of the thermoset composition is between 5% and 85%, preferably between 10% and 75%, by weight of the total weight of the composition.

During the mixing 3, the temperature of the composition rises. First the moisture released from materials is allowed to evaporate and is conducted out of the mixer resulting sufficiently dry composition (e.g. <1% water). The rotational speed of the rotating blades may be controlled such that an even temperature distribution in the composition is achieved.

As the temperature further rises, the surface of thermoplastic polymer material particles melt least partly. In an embodiment, coupling agent(s), if any, and FRP are metered to the mixer not till the thermoplastic polymer material has partly melted. An advantage is that this way stresses directed to FRP fibres and resultanting breakings thereof may be limited and excessive thermal decomposition of thermoset material may be avoided.

The temperature to be pursued depends on e.g. the materials of the particles. According to an aspect, the temperature of the composition is allowed to rise above the glass transition temperature (Tg) of the thermoset composition particles. An advantage is that the thermoset polymer starts becoming somewhat soft, like in jelly form, and gets downsized into fines by mechanical forces induced by the rotating blades in the vessel.

In an embodiment, the melting temperature of the thermoplastic polymer material is not more than 200° C., preferably not more than 170° C.

The particles are simultaneously mixed so that the thermoset composition particles adhere to the thermoplastic polymer material particles, thus forming agglomerates comprising the thermoplastic polymer material and the thermoset composition and optional additional substances 4.

Finally, the agglomerates are cooled by lowering the energy of the agitation, and optionally cooling the agglomerates by cooling means. In some cases, some of the agglomerates may create large lumps of agglomerates. The lumps can be broken by lump breaking means.

The cooled agglomerates form an intermediate agglomerate product 5 that may be utilized in a product manufacturing 6 using various processing methods and apparatuses of thermoplastic materials. In an embodiment, the methods and apparatuses are extruder methods and apparatuses. In another embodiment, the methods and apparatuses are moulding methods and apparatuses, e.g. injection moulding, pressure moulding or rotational casting methods and apparatuses.

According to an aspect, the intermediate agglomerate product 5 may be processed 7 into pellets prior to be utilized in the product manufacturing 6.

According to an aspect, the agglomerates or pellets may be used in multilayer extrusion process. In said process at least one of the layers is manufactured form the composition described in this description. In an embodiment, it is extruded products comprising surface layers and a core layer therebetween. The surface layers may be manufactured from composition comprising first thermoplastic polymer material, PE for instance, having good impact strength, whereas the core layer is manufactured from composition comprising second thermoplastic polymer material, PP for instance, giving high stiffness for the product. In another embodiment, it is manufactured multilayer product having first surface layer that is easy to be glued in surface of another product, whereas another layer(s) of said multilayer product may be optimized for another objectives, such as stiffness, strength, and low cost.

Figure 2:
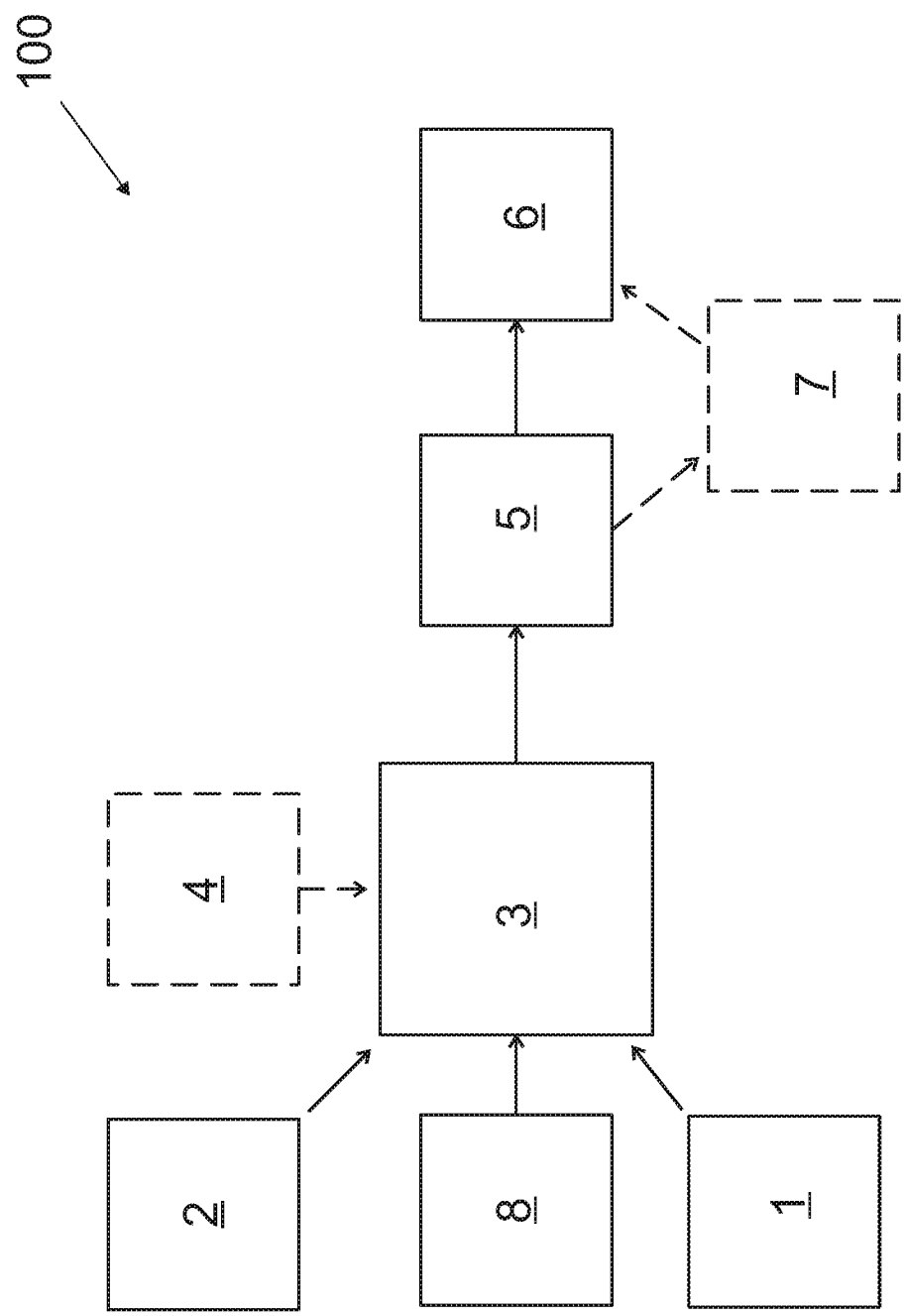
FIG. 2 is a flow chart of another method for manufacturing a plastic composition.

FIG. 2 is a flow chart of another method for manufacturing a plastic composition. Basically, the methods 100 shown in FIGS. 1 and 2 are identical. However, in the method shown in FIG. 2, additional filler 8, such as natural and/or mineral filler particles and/or natural or synthetic fibres, are added in the mixing step 3 as an addition of a separate batch of filler material. The additional filler 8 may be similar to or differ from the fillers, if any, included in the thermoplastic polymer material 1 and/or the thermoset composition 2. The additional filler 8 adheres to the thermoplastic and thermoset materials in the mixing.

The additional filler 8 makes it possible to adjust the physical properties of the composition, especially when fibres are added, and/or lower the costs of the composition by using low-cost filler material.

In an embodiment, the amount of the additional filler 8 is selected so that the total filler content of the composition is not more than 85 wt %.

Example 1

It was mixed recycled HDPE mixed colors thermoplastic polymer material in flake form originated from post-consumer bottles like cosmetics etc., and thermoset composition consisting of extremely fine-sized epoxy/glassfibre dust, directly obtained from sanding of a thermoset composite product, and about 6 weight-% additional substances, i.e. coupling agent MAH plus a processing aid. The composition was also slightly cross-linked by peroxide.

Two compositions were made:

FRC1 that comprised 60 weight-% of the thermoset composition and no other filler; and FRC2 that comprised 40 weight-% of the thermoset composition and 20 weight-% plastic coated liquid packaging board (type TetraPak), downsized into flakes in about 5 mm size, as an additional fibre filler.

Mixing took place in a high intensity mixer type Herfeld heating 100/cooling 200 litre size. Batch weight was 30 kg and cycle time about 30 minutes.

Extrusion of test specimens was made in a rotary extruder CONEX® size 380 mm into a hollow profile in size 60×40 mm with 8 mm wall thickness.

The resulting extruded compositions were tested for flexural properties in 3-point bending device by using EN ISO 178-method by test institute Muovipoli Oy, Nastola, Finland.

Results obtained:

FRC1 flexural strength: 36.2 MPa and bending modulus: 2410 MPa;

FRC2 flexural strength: 33.6 MPa and bending modulus: 2970 MPa.

Typical values of a blow moulding-grade HDPE and tested at injection moulded test specimens are: flexural strength about 26 MPa and bending modulus about 1300 MPa. It can be readily seen that both flexural strength and bending modulus are substantially higher in FRC1 and FRC2. The flexural strength is about 30-40% higher and the bending modulus about 85-130% higher. And if the compositions FRC1 and FRC2 would have been manufactured into test specimens by injection moulding, the difference would have been even higher.

Example 2

It was an extruded panel (A) in size 400×10 mm from virgin biobased HDPE thermoplastic polymer material in pellet form (Braskem grade SGD4960), construction and demolition waste wood, talc, and additional substances, i.e. coupling agent MAH and a processing aid. The composition was also slightly cross-linked by peroxide.

Furthermore, it was extruded biobased thermoset composition in various profile forms (B) consisting of 60 weight-% bioepoxy/glass and 40 weight-%, hemp-fibres.

Both products A and B were first crushed mechanically in a Rapid 300 re-granulator with a 16 mm diameter slot screen and then mixed together in 50/50 ratios, and finally re-manufactured into extruded panels having width 400 mm and thickness 10 mm by rotory extruder CONEX® size 280 mm.

The final composition was consisting of (as weight-%):

biobased HDPE thermoplastic 27.5%
construction & demolition waste wood 44%
fibrereinforced bioepoxy 13.5%
talc 8%
additional substances 7%

The resulting extruded panels were tested for flexural properties in 3-point bending device by using EN ISO 178-method by test institute AIMPLAS Instituto Tecnologico del Plastico, Valencia, Spain.

Results obtained:
flexural strength: 26.7 MPa
bending modulus: 3290 MPa

The manufacturer Braskem informs the biobased HDPE thermoplastic polymer material grade SGD4960 having flexural bending modulus 1600 MPa and thus the re-manufactured panel has bending modulus, i.e. material stiffness, twice as high as the thermoplastic polymer material used, thanks to the combined reinforcement effect of construction and demolition waste wood 44% and recycled fibre reinforced bioepoxy 13.5% and talc 8%.

The invention is not limited solely to the embodiments described above, but instead many variations are possible within the scope of the inventive concept defined by the claims below. Within the scope of the inventive concept the attributes of different embodiments and applications can be used in conjunction with or replace the attributes of another embodiment or application.

The drawings and the related description are only intended to illustrate the idea of the invention. The invention may vary in detail within the scope of the inventive idea defined in the following claims.

REFERENCE SYMBOLS 1 thermoplastic polymer material
2 thermoset composition
3 mixing step
4 additional substances
5 intermediate agglomerate product
6 product manufacturing
7 pelletizing
8 additional filler
100 method

The invention claimed is:

1. A method for manufacturing a plastic composition, comprising:
providing:
thermoplastic polymer material particles and
thermoset composition particles comprising cured thermoset polymer reinforced with fibres, wherein the cured thermoset polymer is chosen from a group consisting of epoxy, polyester, vinyl ester, phenolic, amino, furan, polyurethane, cross-linked thermoplastic, PEX, and combinations thereof,
wherein the size of at least some of the thermoset composition particles are between 5 mm and 100 mm,
adding to a high intensity mixer a batch of the thermoplastic polymer material particles and a batch of the thermoset composition particles to form a combined composition, the mixer comprising:
a vessel establishing an interior space environmentally separable from an exterior space outside of said vessel,
an agitation system comprising a rotatable mixer and a shear heater arranged in said interior space, and
a driver configured to rotate said rotatable mixer,
agitating the particles with the agitation system,
raising the temperature of the combined composition above the glass transition temperature (Tg) of the thermoset composition particles to form agglomerates comprising the thermoplastic polymer material and the thermoset composition, and
cooling the agglomerates.

2. The method as claimed in claim 1, wherein the melting temperature of the thermoplastic polymer material is not more than 200° C.

3. The method as claimed in claim 1, wherein the thermoplastic polymer material is chosen from a group consisting of TPE, PVC and polyolefins, PB, PE and PP, PS, ABS, PMMA, PBA, PLA, PHA, PHB, and combinations thereof.

4. The method as claimed in claim 1, comprising adding filler material that is included in the thermoplastic polymer material particles and/or thermoset composition particles, or as an addition of a separate batch of filler material.

5. The method as claimed in claim 4, wherein the filler material comprises natural fibres derived and chosen from a group consisting of wood, straw, abaca, cotton, cork, bamboo, paper, cardboard, hemp, jute, kenaf, sisal, rice hull, flax, cellulose, coir and combinations thereof.

6. The method as claimed in claim 4, wherein the thermoplastic polymer material particles are derived from hybrid materials selected from the group consisting of plastic coated cardboard, cellulose, metal foil, and combinations thereof.

7. The method as claimed in claim 4, wherein the filler comprises minerals chosen from a group consisting of calcium carbonate, talc, wollastonite, mica, kaolin clay, silica, and combinations thereof.

8. The method as claimed in claim 4, wherein the fibre comprises synthetic fibres chosen from a group consisting of glass, carbon, aramid, PE, boron, silicon carbide, and combinations thereof.

9. The method as claimed in claim 1, comprising adding one or more coupling agent(s) and a crosslinking media in the combined composition.

10. The method as claimed in claim 1, wherein the amount of the thermoset composition is between 5% and 85% by weight of the combined composition.

11. The method as claimed in claim 1, wherein the size of at least some of the thermoset composition particles are between 30 mm and 100 mm.

12. The method as claimed in claim 1, wherein the thermoset composition particles are derived from thermosetting post-industrial and/or post-consumer side streams, waste or shavings.

13. The method as claimed in claim 1, comprising cooling the agglomerates by lowering the energy of the agitation.

14. The method as claimed in claim 1, comprising processing the agglomerates into pellets for use in processing methods of thermoplastic materials.

15. The method as claimed in claim 1, wherein the size of at least some of the thermoset composition particles are between 50 mm and 100 mm.

* * * * *